United States Patent
Pan et al.

(10) Patent No.: US 9,483,327 B2
(45) Date of Patent: Nov. 1, 2016

(54) MECHANISM FOR INTERPOSING ON OPERATING SYSTEM CALLS

(71) Applicant: Vormetric, Inc., San Jose, CA (US)

(72) Inventors: Feng Pan, San Jose, CA (US); Sri Sudarsan, San Jose, CA (US)

(73) Assignee: Vormetric, Inc., San Jose, CA (US)

( * ) Notice: Subject to any disclaimer, the term of this patent is extended or adjusted under 35 U.S.C. 154(b) by 7 days.

(21) Appl. No.: 14/539,634

(22) Filed: Nov. 12, 2014

(65) Prior Publication Data

US 2016/0132365 A1    May 12, 2016

(51) Int. Cl.
*G06F 9/44* (2006.01)
*G06F 9/54* (2006.01)

(52) U.S. Cl.
CPC ...................................... *G06F 9/54* (2013.01)

(58) Field of Classification Search
None
See application file for complete search history.

(56) References Cited

U.S. PATENT DOCUMENTS

| | | | |
|---|---|---|---|
| 6,086,623 A | 7/2000 | Broome et al. | |
| 6,529,985 B1 | 3/2003 | Deianov et al. | |
| 6,587,888 B1 | 7/2003 | Chieu et al. | |
| 6,996,832 B2* | 2/2006 | Gunduc | G06F 9/54 719/328 |
| 7,360,223 B2 | 4/2008 | Durai | |
| 8,230,399 B2 | 7/2012 | Vertes | |
| 2005/0039190 A1* | 2/2005 | Rees | G06F 11/3419 719/316 |
| 2006/0143350 A1* | 6/2006 | Miloushev et al. | 710/242 |
| 2011/0264959 A1* | 10/2011 | Subhraveti | G06F 11/3636 714/35 |
| 2012/0255004 A1* | 10/2012 | Sallam | 726/23 |
| 2012/0290718 A1* | 11/2012 | Nethercutt | 709/224 |

OTHER PUBLICATIONS

International Search Report, PCT/US2015/059413, mailed Feb. 19, 2016.

* cited by examiner

*Primary Examiner* — Andy Ho
*Assistant Examiner* — Abdou Seye
(74) *Attorney, Agent, or Firm* — Womble Carlyle Sandridge & Rice LLP

(57) ABSTRACT

A method for interposing on operating system calls in a host is provided. The method includes patching an operating system kernel function, the patching comprising adding a first pointer that invokes an agent function, the patching performed by an agent. The method includes executing the agent function, responsive to a system call stub calling the operating system kernel function, which invokes the agent function via the first pointer, wherein at least one action of the method is performed by a processor of a host having an operating system.

20 Claims, 6 Drawing Sheets

MECHANISM FOR INTERPOSING ON OPERATING SYSTEM CALLS

BACKGROUND

Third-party software, in some instances, intercepts operating system calls in order to perform various functions. Although the LINUX™ operating system is popular, LINUX™ system calls are more difficult to intercept than system calls in other operating systems, especially as compared to UNIX™. Some of the difficulties with intercepting the system calls include indirect means to read non-exported kernel symbols, special means to overwrite system call vectors (which are normally protected as read-only values), and special ways to handle stub assembler code that is put in place for fork, vfork, execve and clone system call vectors. Frequent system call-related changes in the LINUX™ kernel require developers to repeatedly expend porting efforts. Interoperability among third-party products, including access control products, may be problematic. Therefore, there is a need in the art for a solution which overcomes the drawbacks described above.

SUMMARY

In some embodiments, a method for interposing on operating system calls in a host is provided. The method includes patching an operating system kernel function, the patching comprising adding a first pointer that invokes an agent function, the patching performed by an agent. The method includes executing the agent function, responsive to a system call stub calling the operating system kernel function, which invokes the agent function via the first pointer, wherein at least one action of the method is performed by a processor of a host having an operating system.

In some embodiments, a tangible, non-transitory, computer-readable media having instructions thereupon which, when executed by a processor, cause the processor to perform a method. The method includes overwriting a portion of an operating system kernel function to install a first pointer, the first pointer pointing to an agent function. The method includes executing the agent function, responsive to a system call stub calling the operating system kernel function having the first pointer installed therein.

In some embodiments, a host system, with an operating system, is provided. The host system includes a processor, a memory coupled to the processor and having a system call vector and a plurality of operating system kernel functions therein and an agent stored in the memory. The agent is configured to retain an address of an operating system kernel function. The agent is configured to modify the operating system kernel function to point to an agent function, such that a system call stub calls the agent function via the modified operating system kernel function. The agent is configured to call the operating system kernel function via the retained address of the operating system kernel function.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A mechanism for interposing on operating system calls, which does not rely on modifying the system call vector table, is described. Third-party software products may still overwrite entries on the system call vector table. Although examples are described herein as applying to the LINUX™ operating system, embodiments generally apply to any operating systems that employ a function called a stub, for operating on multiple hardware platforms. Rather than modifying the system call vector table, the embodiments patch the operating system kernel functions to point to an agent function. The agent function is executed when a patched operating system kernel function is called by the stub, irrespective of whether third-party products modify the system call vector table. The present solution thus avoids the interoperability problems among third-party products, and does not require repeated porting when changes are made to system calls and their stub implementations in the operating system kernel.

Figure 1:
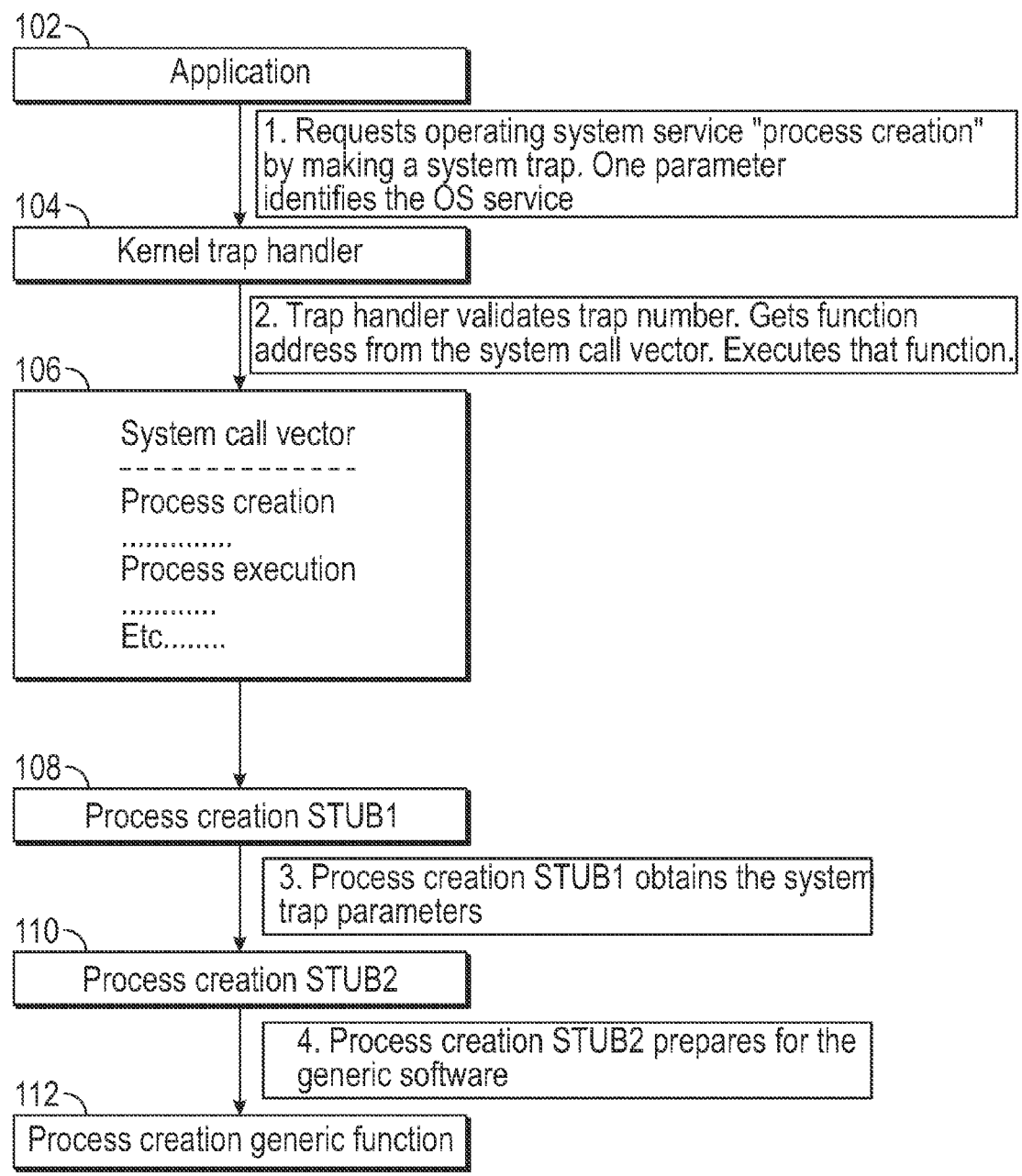
FIG. 1 depicts a mechanism for an application to access operating system kernel services.

FIG. 1 depicts a known mechanism for an application 102 to access operating system kernel services. The present solution can be applied to this known mechanism. The example is applicable to LINUX™, as well as other operating systems. The application 102 requests an operating system service (i.e., a kernel service), which the operating system handles by making a system trap and initiating a process creation. One parameter identifies the operating system service with a number. The kernel trap handler 104 validates this trap number, and uses the trap number to access a vector of addresses of kernel-level functions. The kernel trap handler 104 gets a process creation stub from the system call vector 106. The kernel trap handler 104 then executes the selected stub.

Executing the selected stub results in process creation (e.g. forking or cloning), process execution or similar stubs and process destruction, and possible further actions. The process creation stub (i.e., the selected stub) has a first process creation stub 108 (e.g., Stub1), which obtains system trap parameters. The first process creation stub also has a second process creation stub 110 (e.g., Stub2), which prepares for generic software. This results in execution of a selected process creation function 112, e.g., a generic function. In this manner, the application request for an operating system kernel service is fulfilled.

Figure 2:
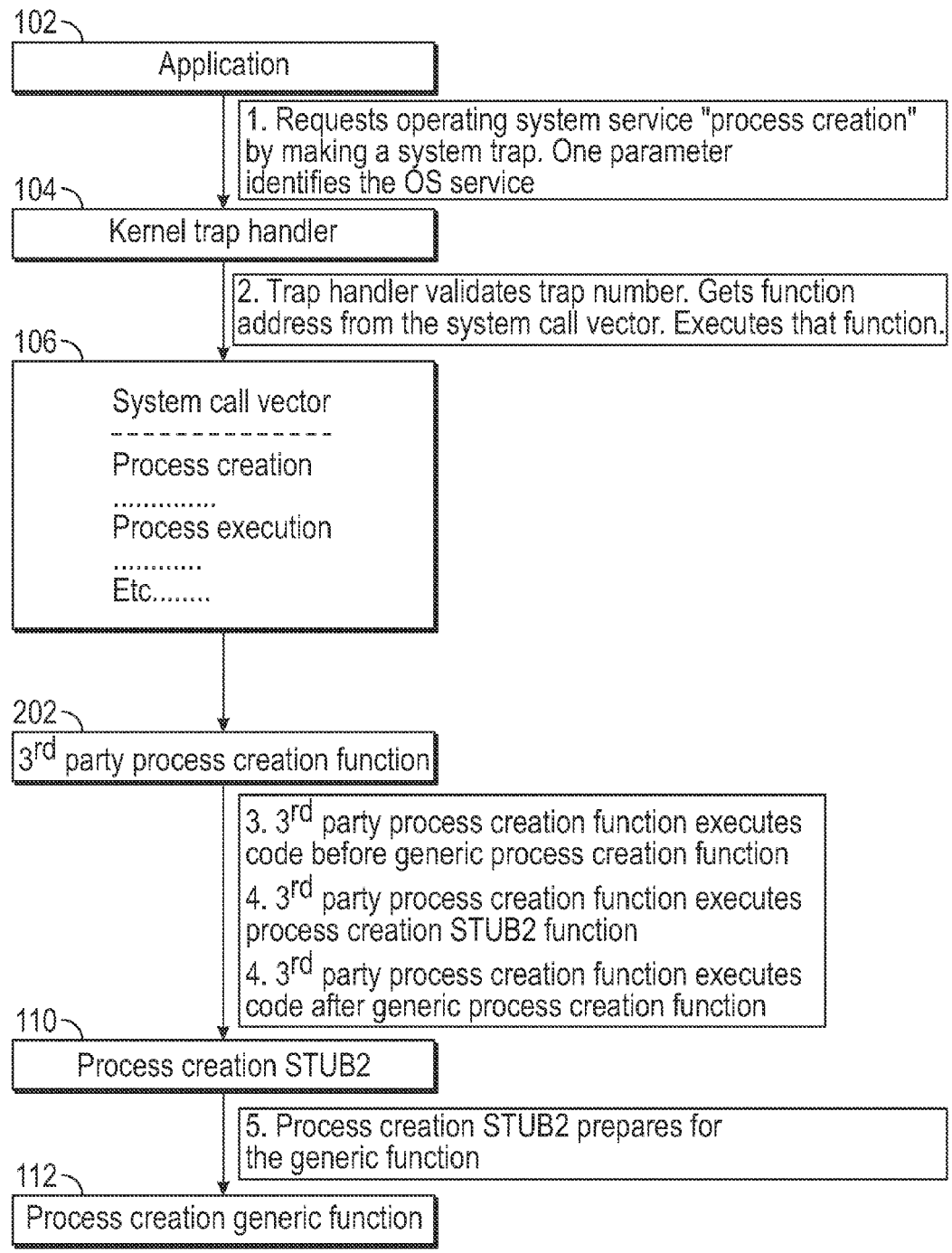
FIG. 2 depicts a mechanism for third-party interception of a system call vector.

FIG. 2 depicts a known mechanism for third-party interception of a system call vector. The present solution can be applied to this known mechanism. As with FIG. 1, this example is applicable to LINUX™, and may be applicable to other operating systems. Some third-party software products enhance an operating system by taking various actions when an application requests an operating system service via a system trap. In such cases, the third-party software locates a vector entry for the system call of interest, and substitutes a function address for a third-party function. Generally, the third-party software records the address of the operating system process creation stub 110, so that the third-party software code can execute the host operating system function at a point chosen by that third-party software. The third-party software function can perform actions before and/or after the original operating system function.

Here, the third-party software patches the system call vector 106, to point to the third-party process creation function 202. The application 102 may be distinct from the third-party software, or these may be interrelated or combined. Typically, the patch involves writing a pointer over the original system call vector. As above, the application 102 requests an operating system service (i.e., a kernel service), which is handled by making a system trap and initiating a process creation. One parameter identifies the operating system service with a number. The kernel trap handler 104 validates the trap number. The kernel trap handler 104 gets a process creation stub from the system call vector 106. However, this time the process creation stub calls the third-party process creation function 202, since the system call vector 106 has been modified by the third-party software. The kernel trap handler 104 then executes the third-party process creation function 202.

Executing the third-party process creation function 202, or a third-party process execution function results in operating system process creation or operating system process execution, and possible further actions. One of the processes created executes code from the third-party software, which may be executed before or after the operating system kernel service. In the example shown, the third-party process creation function 202 executes third-party code before the host operating system process creation function. Then, the third-party process creation function executes the process creation stub2 110 function. This process prepares for the generic process creation function shown as the selected process creation function 112. In the example shown, the third-party process creation function 202 then executes third-party code after the host operating system process creation function. In this manner, both the application request for an operating system kernel service, and the third-party interception of the system call vector, are fulfilled. Problems arise when multiple third-party software applications patch the system call vector 106. If the same vector is overwritten, first by one third-party software application and later by another third-party software application, the first one loses and is dislodged. This situation will be further described with reference to FIG. 4.

Figure 3:
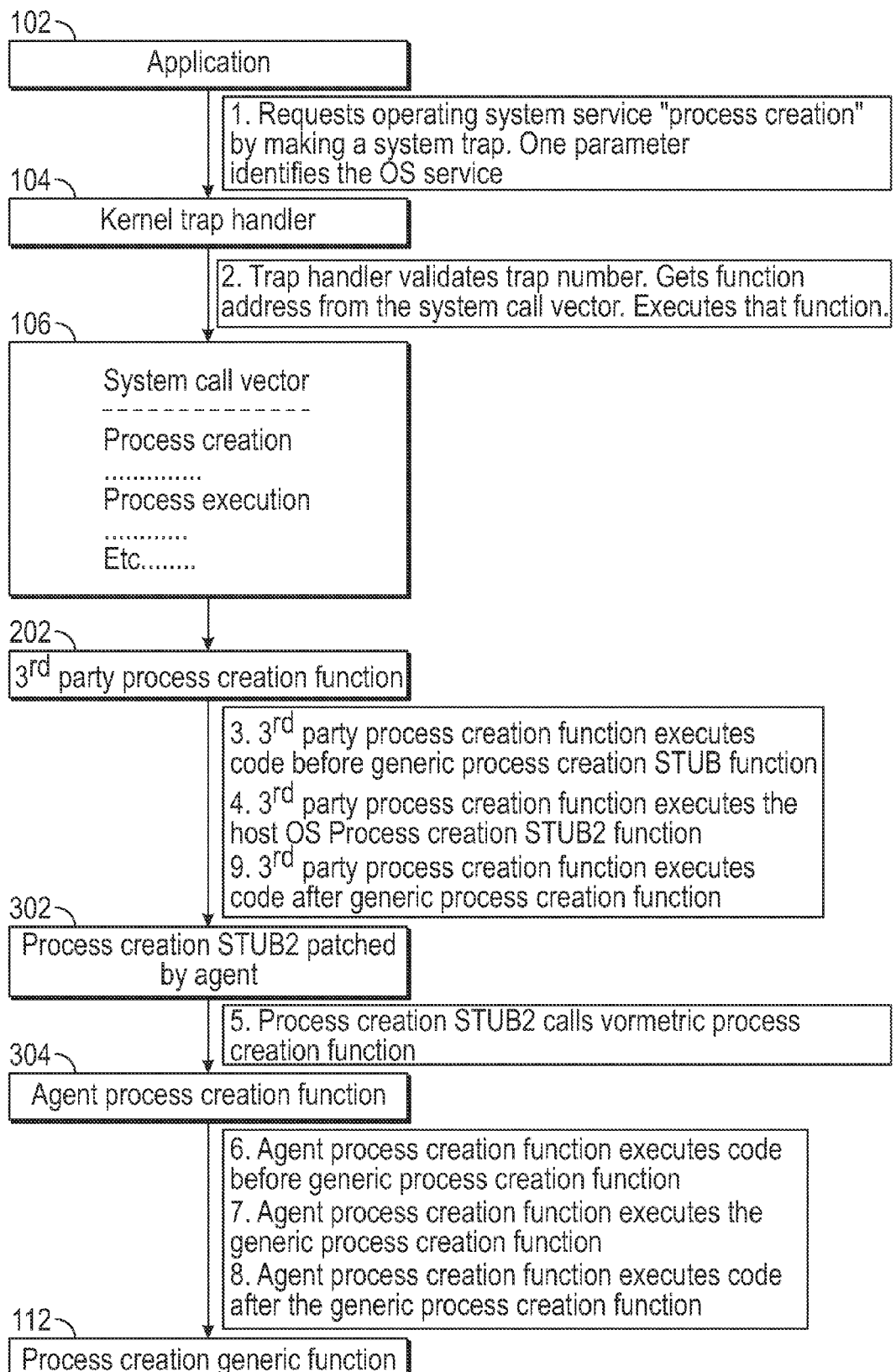
FIG. 3 depicts a mechanism for interposing on operating system calls, in accordance with some embodiments.

FIG. 3 depicts a mechanism for interposing on operating system calls, in accordance with some embodiments. This example follows and modifies the scenario depicted in FIG. 2, and retains the third-party software patch to the system call vector 106. It should be appreciated that the present mechanism could also be applied to the scenario depicted in FIG. 1, in which there is no third-party patch to the system call vector 106. In both cases, the present mechanism employs an agent (e.g., a Vormetric™ agent) that patches the operating system kernel functions, causing an agent function to be called and executed as a semantic equivalent to the operating system kernel function. As with FIGS. 1 and 2, this example is applicable to LINUX™, and may be applicable to other operating systems.

As above, the application 102 requests an operating system service (i.e., a kernel service), which is handled by making a system trap and initiating a process creation. One parameter identifies the operating system service with a number, i.e. the trap number. The kernel trap handler 104 validates the trap number. The kernel trap handler 104 gets a process creation stub from the system call vector 106. As in FIG. 2, the process creation stub calls the third-party process creation function 202, since the system call vector 106 has been modified by the third-party software. The kernel trap handler 104 then executes the third-party process creation function 202.

Executing the third-party process creation function 202 or the third-party process execution function, results in process creation or process execution and process destruction, and possible further actions. One of the processes created executes code from the third-party software, which may be executed before or after the operating system kernel service. In the example shown, the third-party process creation function 202 executes third-party code before the host operating system process creation function. Then, the third-party process creation function executes the patched process creation stub2 302 function. As far as the third-party software is concerned, it is executing the same process creation stub 110 as shown in FIG. 2, as the third-party software is unaware of the agent patch. But, executing the patched process creation stub2 302 calls the agent process creation function 304. The agent process creation function 304 executes code, such as an agent function, then executes the process creation generic function 112. In the example shown, the agent process creation function then executes further code, such as another agent function or a continuation of the agent function, after the host operating system process creation function. In variations, the agent process creation function could execute an agent function before or after the selected process creation generic function 112, or both, or could execute just the agent function as a replacement, and neither select nor execute a kernel function. In this manner, the application request for an operating system kernel service, the third-party interception of the system call vector, and the execution of the agent function, as arranged by the interposing on the operating system call, are all fulfilled.

Figure 4:
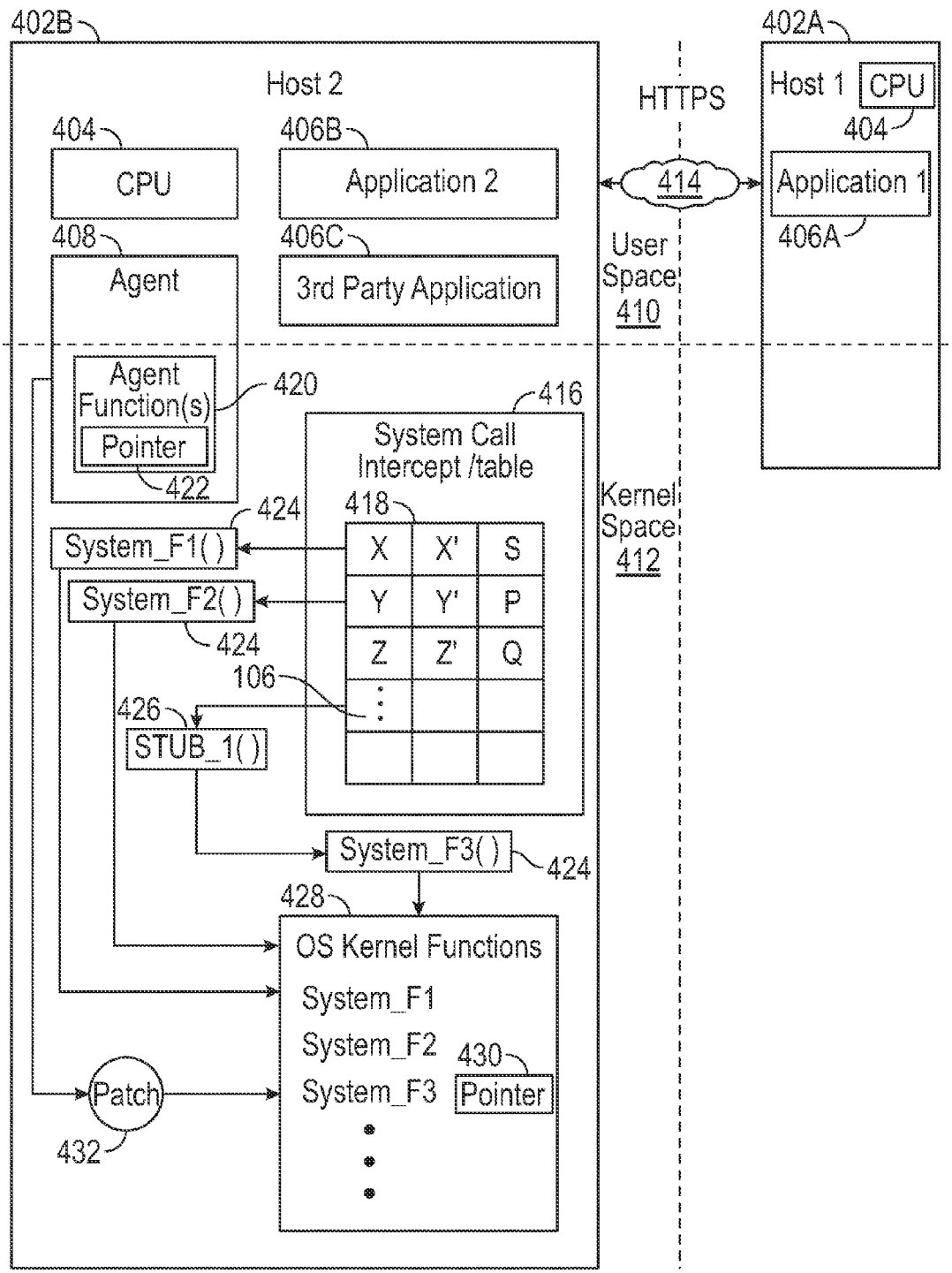
FIG. 4 is a system diagram illustrating two hosts interacting, one of which has an agent implementing the mechanism of FIG. 3 in accordance with some embodiments.

FIG. 4 is a system diagram illustrating two hosts 402 interacting, one of which has an agent 408 implementing the mechanism of FIG. 3. Example applications 406 are described herein, although the below scenario could apply to further applications, and the mechanism and principles could apply to further embodiments and further operating systems. A first host 402A "Host 1" has a first application 406A "Application 1" operating under an operating system. A second host 402B "Host 2" has a second application 406B "Application 2" and a third-party application 406C operating under an operating system. The hosts 402 could be servers or other computing devices, and could be physical machines or virtual machines implemented with physical resources. Each host 402A, 402B has a CPU (central processing unit) 404 which could be a single processor or multiprocessor embodiment. The second host 402B has an agent 408, which has one or more agent functions 420.

The hosts 402A, 402B are communicating via a network 414 such as the global communication network known as the Internet. For example, they are communicating with the secure communication protocol HTTPS (hypertext terminal protocol, secure). User space 410 is indicated as the portion of each host 402 (e.g., software, user interfaces) with which a user can interact. The applications 406 reside in user space, as does the HTTPS communication channel. Kernel space 412 is indicated as the portion of each host 402 that manages input/output requests from software and manages other operating system functions, i.e., kernel functions.

In kernel space 412 on the second host 402B, a system call intercept/table 416 is used by the operating system for system calls, as described above with reference to FIGS. 1-3. Example entries for the system call vector table 418 are shown as "X, Y, Z". Each entry in the system call vector table 418 is a vector quantity or stub case for the system call intercept/table 416, and has an address which points to code in the operating system kernel functions 428. This pointing may have one or more levels of indirection. As an example for patching by the third-party application 406C, the entries could be replaced by one or more of "X', Y', Z'", which could in turn be replaced by another third-party application by one or more of "S, P, Q", causing the aforementioned interoperability problems.

Also found in kernel space 412 on the second host 402B, as mentioned above, are the operating system kernel functions 428. The agent 408 occupies both user space 410 and kernel space 412, on the second host 402B. That is, a portion of the agent 408 acts as an application, and is accessible for user interaction, for example for an administrator to set parameters. A further portion of the agent 408 operates in kernel space 412, to place a patch 432 in the Linux operating system kernel functions 428. The patch 432 is part of the mechanism for interposing on operating system calls, and includes overwriting one or a portion of the operating system kernel functions 428 with a first pointer 430, as is further described in the scenario below.

The first application 406A, on the first host 402A, could be software for inventory management, credit card or personal data management, or sales and purchases, as operated by various users in a retail environment. The second application 406B, on the second host 402B, could be software for accounting, database management, backup, archiving or other function(s) with which the first application 406A interacts, or could be unrelated to the first application 406A. The third-party application 406C could be an access control product that intercepts system calls under a secure filesystem. The agent 408 could be or include software that sets up and manages attributes involved in encryption and decryption for the secure filesystem. The secure filesystem is transparent under the first and second applications 406A, 406B.

As in the examples of FIGS. 2 and 3, the third-party application 406C patches the system call intercept/table 416, by overwriting a vector quantity (i.e., one of the entries) of the system call vector table 418 in the system call intercept/ table 416. It does so in order to execute third-party application code when the second application 406B requests an operating system service, resulting in a system call. The agent 408 patches the operating system kernel functions 428, as follows.

The agent 408 saves the address of the operating system kernel function 428, for example, the address of the kernel function "system_F3", as a pointer 422 in or coupled to the agent functions 420. For example, the agent 408 could store this as a second pointer 422 in memory in the second host 402B. The agent 408 places the first pointer 430 in the Linux operating system kernel functions 428, for example by overwriting a portion of the kernel function "system_F3".

The patch 432 causes the specified operating system kernel function 428 to point to the agent function 420, via the first pointer 430. The agent 408 retains the second pointer 422 so as to be able to call the operating system kernel function 428, as described with reference to FIG. 3.

Continuing with the above scenario, the second application 406B requests an operating system service, resulting in a system trap and initiating a process creation. Executing the third-party process creation function 202 (with reference back to FIG. 3) results in calling the stub function 426, e.g., "stub_1 ( )". In this scenario, stub_1 ( ) is an example of a process creation stub2 302 function, with parameters in the parentheses. The stub function 426 calls one of the operating system kernel functions 428, e.g., "system_F3 ( )". In this scenario, system_F3 ( ) is an example of the patched LINUX™ operating system kernel function 428. Because of the patch 432, calling the modified LINUX™ operating system kernel function 428 results in executing the agent function 420 pointed to by the first pointer 430. Other system calls 424 can be called based on the system call intercept/table 416, and these can call and execute other LINUX™ operating system kernel functions 428 in the usual manner. The agent function 420 can call the LINUX™ operating system kernel function 428 via the second pointer 422, as described above with reference to FIG. 3. More than one of the LINUX™ operating system kernel function 428 could be patched, and calls to one of these as modified perform as above. Specific examples of the patch 432 as applied to a secure filesystem "secfs" are given below.

In one example, a stub implementation which has the following call hierarchy: sys_call_table[_NR_execve]->stub_execve(  )->sys_execve(  )->do_execve( )->open_exec( ) would have the following hierarchy after secfs patching: sys_call_table[_NR_execve]->stub_execve->sys_execve->do_execve->m_open_exec->open_exec Here, instead of manipulating at a higher system call layer (e.g., stub_execve( ) or sys_execve( ) functions), the agent patches open_exec( ) to call the m_open_exec( ) function (i.e., the modified operating system kernel function, which causes the agent function to execute). Typically, a third-party product would manipulate at the stub_execve( ) or sys_execve( ) functions, but would continue to call the patched functions such as m_open_exec( ) via third-party products or operating system native system call vectors.

In one embodiment, the agent 408 has a secure filesystem (secfs) kernel module that interposes system call handlers into the system call intercept/table 416 for detecting and implementing the following:

(a) Process creation, execution and exit. Establishment of trusted status, access control and detection and auditing of setuid executables (i.e., user alias detection) is accomplished by interception of these classes of system calls.

(b) Guarding of automounted (e.g., autofs) file systems by interception of mount, umount and related system calls. Interception of mount system calls also permits the secfs kernel module to fail attempts to mount on top of guarded filesystems.

(c) Failing attempts to forcibly unload kernel modules.

(d) Failing system calls that are used to terminate agent processes.

Figure 5:
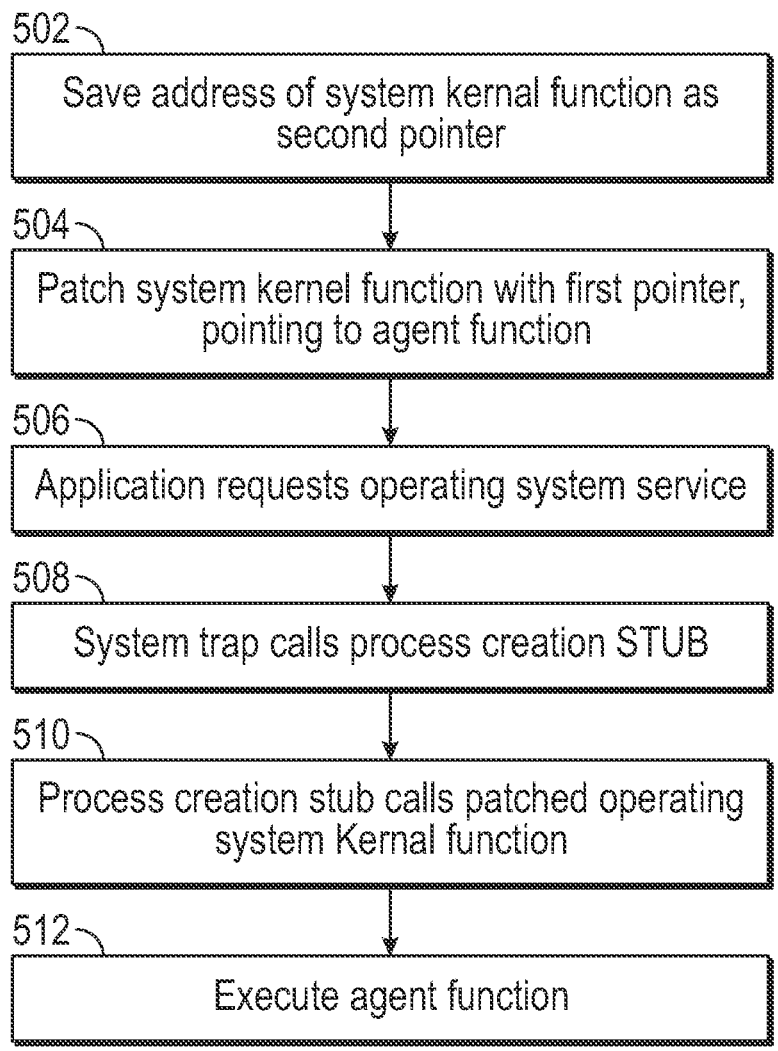
FIG. 5 is a flow diagram of a method for interposing on operating system calls, which can be practiced using the mechanism of FIG. 3 or the system of FIG. 4, in accordance with some embodiments.

FIG. 5 is a flow diagram of a method for interposing on operating system calls, which can be practiced using the mechanism of FIG. 3 or the system of FIG. 4, among other possibilities. The method can be practiced by a processor, such as a processor of a host server or other computing device that has an operating system with kernel functions.

The address of a system kernel function is saved, as a second pointer, in an action 502. This action can be performed by an agent in the host server, and the pointer is saved so that the agent can later call the system kernel function via the second pointer. The system kernel function is patched with a first pointer, in an action 504. The first pointer points to an agent function. Patching can be performed by overwriting a portion of the operating system kernel function, writing the first pointer as a patch, as depicted in FIG. 4.

An application requests an operating system service, in an action 506. This and related actions are described with reference to FIGS. 1-3. A system trap calls a process creation stub, in an action 508. For example, the system trap could get a process creation stub from a system call vector, e.g., the system call vector table 418 shown in FIG. 4. This could invoke the operating system process creation stub directly, if there is no third-party interception of the system call vector. Or, the third party software could invoke the operating system process creation stub, if the third-party software has intercepted the system call vector.

The process creation stub calls the patched operating system kernel function, in an action 510. This action is described with reference to FIGS. 3 and 4. The patched operating system kernel function has the first pointer, which points to the agent function, per the action 504. The agent function is executed, in an action 512, as a result of the process creation stub calling the patched operating system kernel function. The agent function may replace the operating system kernel function, or call the operating system kernel function before and/or after executing agent code.

Figure 6:
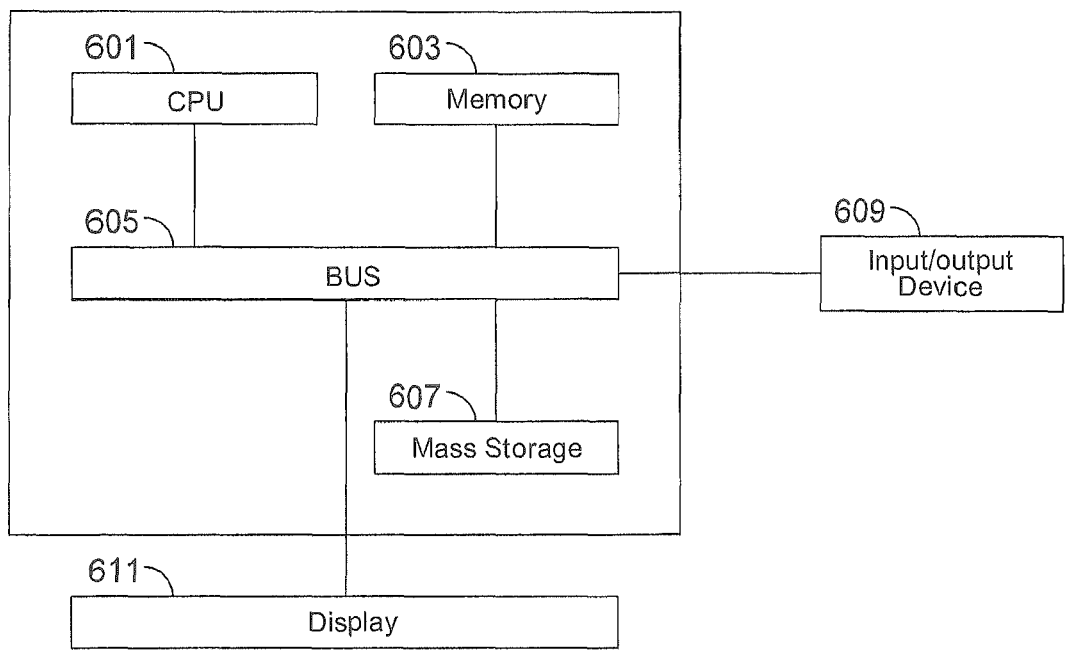
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for interposing on operating system calls in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS-WINDOWS™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for interposing on operating system calls in a host, comprising:
   patching an operating system kernel function, the patching comprising adding a first pointer that invokes an agent function;
   executing the agent function, responsive to a system call stub calling the operating system kernel function, which invokes the agent function via the first pointer, the executing comprising;
      handling a system trap, responsive to an application requesting a system call service;
      obtaining the system call stub from a system call vector, responsive to the handling the system trap;
      executing the system call stub, wherein one of a third party process creation function executes code before a process creation stub function, the third party process creation function executes code after the process creation stub function, or no third party process creation function executes code before or after the process creation stub function; and
      calling the operating system kernel function from the system call stub.

2. The method of claim 1, wherein the patching is performed by an agent without the agent patching a system call vector table.

3. The method of claim 1, further comprising:
   invoking the operating system kernel function from the agent function, wherein the agent function includes a second pointer, which points back to the operating system kernel function.

4. The method of claim 1, further comprising:
   executing an agent process creation or execution function, responsive to the system call stub calling the agent process creation or execution function via the first pointer, wherein the agent process creation or execution function invokes the agent function and the operating system kernel function; and
   executing the operating system kernel function, before or after executing the agent function.

5. The method of claim 1, wherein the patching overwrites an operating system call stub function with a semantic equivalent in the agent function, which in turn calls the operating system stub function.

6. The method of claim 1, further comprising:
executing the system call stub, responsive to a system trap incurred by an application, wherein the system call stub includes a common stub and a platform selection stub, and wherein the platform selection stub calls the operating system kernel function.

7. The method of claim 1, wherein patching the operating system kernel function includes:
saving an address of the operating system kernel function, wherein the address of the operating system kernel function is available to the agent to call the operating system kernel function; and
writing the first pointer into memory of the host so that the system call stub calls the agent function via the first pointer.

8. The method of claim 1, wherein the patching ensures that the agent function executes regardless of whether a third-party software modifies a system call vector that is employed by the system call stub to call the operating system kernel function.

9. A tangible, non-transitory, computer-readable media having instructions thereupon which, when executed by a processor, cause the processor to perform a method comprising:
overwriting a portion of an operating system kernel function to install a first pointer in the operating system kernel function, the first pointer pointing to an agent function;
executing the agent function, responsive to a system call stub calling, via a system call intercept table, the operating system kernel function having the first pointer installed therein in a portion of memory distinct from the system call intercept table, the executing comprising;
obtaining the system call stub from a system call vector, responsive to handling a system trap;
executing the system call stub, wherein one of a third party process creation function executes code before a process creation stub function, the third party process creation function executes code after the process creation stub function, or no third party process creation function executes code before or after the process creation stub function; and
calling the operating system kernel function from the system call stub.

10. The computer-readable media of claim 9, wherein the system call stub includes a common stub and a platform selection stub, and wherein the platform selection stub calls the operating system kernel function having the first pointer installed therein.

11. The computer-readable media of claim 9, further comprising:
handling a system trap, responsive to an application requesting a system call service.

12. The computer-readable media of claim 9, wherein the method further comprises:
saving an address of the operating system kernel function to memory as a second pointer, prior to overwriting the portion of the operating system kernel function; and
applying the second pointer to call the operating system kernel function from the agent function.

13. The computer-readable media of claim 9, wherein the method further comprises:
executing an agent system call function that calls the agent function and the operating system kernel function, responsive to the system call stub calling the operating system kernel function having the first pointer installed therein, wherein executing the agent function is responsive to calling the agent function, and wherein the agent function is executed before or after the operating system kernel function is executed.

14. The computer-readable media of claim 9, wherein the method further comprises:
repeating the overwriting with further pointers and further operating system kernel functions, to intercept a class of system calls stub implementations relating to a secure filesystem.

15. A host system, with an operating system, the host system comprising:
a processor;
a memory coupled to the processor and having a system call vector and a plurality of operating system kernel functions therein; and
an agent stored in the memory, the agent configured to retain an address of an operating system kernel function, the agent configured to modify the operating system kernel function by overwriting a portion of the operating system kernel function as distinct from a system call table that resides elsewhere in the memory, to have the modified operating system kernel function point to an agent function, such that a system call stub calls the agent function via the system call table pointing to the modified operating system kernel function that points to the agent function, the agent configured to call the operating system kernel function via the retained address of the operating system kernel function, the agent further configured to execute the system call stub, wherein one of a third party process creation function executes code before a process creation stub function, the third party process creation function executes code after the process creation stub function, or no third party process creation function executes code before or after the process creation stub function.

16. The host system of claim 15, wherein the processor is configured, with the operating system, to make a system trap responsive to an application, obtain a system call stub from the system call vector responsive to making the system trap, execute the system call stub, and call the modified operating system kernel function from the system call stub.

17. The host system of claim 15, wherein:
the modified operating system kernel function is configured to point to the agent function via a first pointer; and
the agent is configured to retain the address of the operating system kernel function as a second pointer stored in the memory.

18. The host system of claim 15, wherein the agent does not modify the system call vector.

19. The host system of claim 15, wherein third-party software modification of the system call vector does not affect ability of the system call stub to call the agent function via the modified operating system kernel function.

20. The host system of claim 15, further comprising:
the agent having an agent system call function configured to invoke the agent function and the operating system kernel function.

* * * * *